(12) United States Patent
Daoud

(10) Patent No.: US 6,282,285 B1
(45) Date of Patent: *Aug. 28, 2001

(54) OPTIMIZED MULTILAYER WIRING HOUSING

(75) Inventor: Bassel Hage Daoud, Parsippany, NJ (US)

(73) Assignee: Avaya Technology Corp., Basking Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/118,184

(22) Filed: Jul. 17, 1998

(51) Int. Cl.[7] .................................................. H04M 1/00
(52) U.S. Cl. ............................................................ 379/399
(58) Field of Search .................................... 379/399, 326, 379/327, 328, 329; 361/724, 725, 752, 755

(56) References Cited

U.S. PATENT DOCUMENTS

| | | |
|---|---|---|
| 3,611,264 | 10/1971 | Ellis . |
| 4,662,699 | 5/1987 | Vachhani et al. . |
| 4,850,014 * | 7/1989 | Gillis et al. ............................ 379/399 |
| 4,913,659 | 4/1990 | Doyle . |
| 5,363,440 | 11/1994 | Daoud . |
| 5,537,456 * | 7/1996 | Bonvallat et al. .................... 379/399 |
| 5,978,472 * | 11/1999 | Tuvy et al. ............................ 379/399 |

OTHER PUBLICATIONS

Technical Data Sheet of A.C. Egerton Limited, related to Mini Rocker Cross Connector Cabinets, Nov. 1995.

* cited by examiner

*Primary Examiner*—Jack Chiang
(74) *Attorney, Agent, or Firm*—Stroock & Stroock & Lavan LLP

(57) ABSTRACT

A housing for distributing conductors from a cable passing within the housing includes a base, a layer, and an insertable chamber separator detachably mounted to and disposed within the base for dividing the base into a plurality of conductor receiving chambers. The separator includes a first dividing wall for dividing the volume of the base along a first plane and a second dividing wall for dividing the volume of the base along a second plane.

27 Claims, 5 Drawing Sheets

OPTIMIZED MULTILAYER WIRING HOUSING

FIELD OF THE INVENTION

This invention relates to a multilayered housing for interfacing telephone lines with a network and for distributing multiple wire pairs to various local and/or remote locations within or without a building.

BACKGROUND OF THE INVENTION

Telephone lines, which are carried by electrical conductors known as tip ring wire pairs, are generally aggregated at a particular point in a building prior to being distributed and connected to various types of telephone equipment, such as, for example, telephones, fax machines, modems, etc. Tip ring wire pairs generally enter the building as part of a multi-conductor cable, and, as such, must be broken out from the cable into individual wire pairs prior to connecting individual pairs. This is normally accomplished in a junction box commonly known as a building entrance protector (BEP) and/or network interface unit (NIU). Within such devices the individual telephone line tip ring pairs are separated from the cable, individually connected to a connector block, and made available for further electrical connection and distribution. Usually, a protector device is inserted between the telephone central office (or network side of the telephone line) and the customer equipment (or terminal side of the telephone line) to protect the telephone or other equipment connected to the telephone line and the user of such equipment from hazardous overvoltages induced in the telephone network or in the cables passing between the telephone central office and the building within which the line is terminated.

In a typical arrangement, the telephone lines coming from the network are first wired to a protector field, which is an array of connectors for receiving the protector device, which is in turn hard-wired to a first connector block which provides a first test point for testing the telephone line connections between the building and telephone central office. This first terminal block is hard-wired to a multi pair connector, most typically a twenty-five pair connector of the RJ21 type, for further connection to an array of customer bridges which are also hard wired and connectorized via a mating RJ21 connector. The use of a customer bridge permits a subscriber to disconnect terminal equipment from a telephone line so that the subscriber can isolate troubles on the line as originating in the telephone network, or on the terminal equipment side of the telephone line. An example of such an arrangement is shown in U.S. Pat. No. 5,363,440, dated Nov. 8, 1994, the disclosure of which is incorporated herein by reference. U.S. Pat. No. 5,363,440, depicts a multi-layered network interface unit that results in size economies because the customer bridge connector block is hingeably connected to the telephone network protector array field so that rather than placing these two arrays side by side they can be mounted in overlying relationship, resulting in a saving of space.

BEP housings are generally fabricated from a number of individual components or compartments. One example of a prior art BEP housing is shown in FIG. 1, and is generally indicated at 320. Such a BEP housing typically includes a swivel stub mounting panel 355 for providing a location at which a cable (not shown) enters the BEP, a component mounting panel 356 mounted to swivel stub mounting panel 355 to form a wiring chamber 340, a network cover support bracket 357 mounted to component mounting panel 356, and a network cover 358 hingedly connected to network support bracket 357 to form a network chamber 350. Component mounting panel 356 may serve as a mounting site for electrical components, such as a connector block 375 and a surge protector panel 374, while mounting panel 355 may serve as a mounting site for a swivel stub 370 for channeling the wire pairs of a cable into wiring chamber 340. In addition, prior art configurations often include a network interface module 351, having a customer bridge mounting panel 353 for providing a location to mount a connectors, such as RJ11-type connectors 336. A customer bridge cover 331 is hingedly connected to cover support bracket 357, and along with bridge mounting panel 353 form a customer bridge chamber 335. Finally, such prior art configurations often include a connector module 359, having a mounting cover 354 for providing a location to mount a multi-pair connector, most typically a twenty-five pair connector, such as an RJ21-type connector 376, and a splice chamber 330, having a base 352, and a chamber cover 323 connected to base 352 by a hinge 325, for providing an enclosed area to splice wires.

These separate modules or housing components are combined in a wide variety of configurations to satisfy customer requirements and comply with local BEP codes. As a result, it is necessary to employ a costly stocking process to ensure that a large number of each of these components are available to quickly fabricate a specific BEP design.

In addition, mounting the multiple components or compartments of a prior art configuration requires a significant labor expenditure. In a typical arrangement, a telephone line entering housing 320 is first broken out into individual pairs in splice chamber 330, or alternatively, in wiring chamber 340. The individual pairs are then wired to protector panel 374, which in turn is hard wired to connector block 375. Connector block 375 provides a first test point for testing the telephone line connections between the building and telephone central office. This first terminal block may then be hard-wired to a multi-pair connector, such as RJ21 connector 376, for further connection to a customer bridge, which may also be hard-wired and connectorized via a mating RJ21 connector.

Alternatively, as is shown in FIG. 1, a number of wire pairs may be wired from connector block 375 to RJ11-type connectors 336 contained within customer bridge chamber 335 to provide a second test point for testing the telephone line connections. The remainder of the wire pairs from connector block 375 may be hard-wired to RJ21-connectors 376 so that the wire pairs may be further connected to a customer bridge at a location remote to housing 320.

When the installer connects wiring between components located in different compartments, the installer must pass the wiring through holes in the compartment walls. Depending on the local code, the wiring may have to be protected by a conduit or the like requiring further labor to complete assembly.

Further, depending on the design of the building and the number of telephone pairs required, BEPs may be stacked one above the other on a support surface, generally a wall or back plane. Where the incoming cable is passed behind swivel stub mounting panel 355, as is shown in FIG. 1, and into swivel stub 370, it becomes difficult to lay a second cable alongside a previously laid cable due to space restrictions. Finally, the multi-compartment configuration of the prior art requires a mounting area large enough to support such a structure.

Thus, in a prior art configuration it is necessary to mount a number of different components, and at specific points during assembly to run wire through cutouts in those components. This system of assembly requires that much of the installation be done at the site, often at locations that make it difficult to quickly complete the assembly process.

SUMMARY OF THE INVENTION

The present invention is directed at overcoming the shortcomings of the prior art. Specifically, the invention is directed to a multi-layered enclosure for terminating and distributing wire pairs from a cable. The enclosure includes a rear layer, having a base, a front layer, a cover, and an insertable compartment separator. The rear layer is preferably hingedly connected to the front layer, which, in turn, is hingedly connected to the cover. The compartment separator divides the volume of the rear layer into compartments, and in conjunction with the base, the front layer, and the cover, forms a splice chamber, a wiring chamber, and a network chamber.

The front layer includes a bridge panel positioned substantially parallel to the cover and extends from the first side wall of the front layer to the second side wall of the front layer. The bridge panel, together with the cover and a portion of the top, bottom and first and second side walls of the front layer, create the bridge chamber within the front layer of the enclosure. The bridge panel may be used as a mounting site for various connectors from which telephone wire pairs may be hard-wired to various terminal equipment, such as facsimiles and telephones.

The compartment separator is preferably T-shaped, and inserted such that the "cross" of the T-shape (or depth divider) extends from the back wall of the enclosure to abut the bridge panel when the front layer is in a closed position. In this way, the depth divider, together with a portion of the back wall of the enclosure, the top, bottom and a side wall of the base and the front layer, and a portion of the bridge panel, create a splice chamber in the enclosure. The depth divider can support a swivel stub, which is preferably contained within the splice chamber, and which channels a multi-conductor cable to the housing where individual wire pairs may be broken out.

Alternatively, the enclosure may include a splice chamber cover hingedly connected to the rear layer, which, together with the depth divider of the compartment separator, a portion of the rear wall, the top wall, bottom wall and a side wall of the base and the front layer, form the splice chamber.

The portion of the separator conforming to the upstanding portion of the T shape (or length divider) extends substantially perpendicularly from the depth divider to the inside surface of a second side wall of the base opposed to the depth divider. In this way, the length divider, together with a portion of the depth divider, the back, top, bottom and second side wall of the base, create the wiring chamber within the rear layer of the enclosure.

The splice chamber or the wiring chamber provides an area in which individual line pairs may be broken out from the multi-conductor cable and attached to a splice connector and/or the surge protector panel and in turn to the connector block.

Further, the length divider of the separator, together with portions of the bridge panel, the depth divider, and the top, bottom and second side walls of the base and front layer, create the network chamber within the enclosure. The length divider may have one or more through holes or knockouts through which conductors may be run from the wiring chamber to the network chamber.

The separator may be used as a mounting site for various electrical components, such as, a surge protector panel and connector blocks, and may be pre-wired for modular insertion into the enclosure, thereby simultaneously eliminating the need to assemble multiple component chambers on-site and simplifying the wiring task.

By providing a multi-layer housing, less space is required to mount the housing, and the method of installing a housing having a customer bridge is more readily standardized, as the installer quickly becomes proficient at wiring the components via preformed wiring paths. Further, the housing can include a locking mechanism that permits the customer access to the customer bridge compartment, while preventing access to the splicing, network, and wiring compartments of the first layer. In this manner, the customer may reconfigure their telephone wiring without contacting the installer of the housing. Finally, prior to installation, the telephone wiring may be hard-wired from the connector block in preparation for wiring the conductors to the RJ11 connectors located in the customer bridge compartment, thereby increasing installation efficiency.

A side wall of the enclosure provides a mounting location for RJ21 interconnect plugs. This side wall may include knockouts, such as those described in U.S. patent application Ser. No. 09/039,745, entitled BLANK PANEL WITH INTEGRATED PHYSICAL COVER AND MOUNTING ARRANGEMENT FOR A RJ 21 CONNECTOR, filed on Mar. 16, 1998, and U.S. patent application Ser. No. 09/039,817, entitled A CONNECTOR MOUNTING ARRANGEMENT IN A CENTER LOCATION OF A PLASTIC BOX, filed on Mar. 16, 1998, the entire disclosures of which are incorporated herein by reference. These knockouts permit the installer to run conductors from the network chamber to a first RJ21 directly, and/or through the length divider throughhole and the wiring chamber to a second RJ21. In addition, the installer may run conductors from the wiring chamber directly to the second RJ21 through a knockout, or through the through hole and the network chamber to the first RJ21 connector.

By providing an insertable separator, the equipment component/wiring layout for any given design may be factory pre-installed on the separator at a location remote from the installation site. Therefore, on-site assembly time is further reduced, as the electrical components are mounted and wired prior to installation. In addition, by standardizing the enclosure base, the number of housing components required to be mounted at the installation site is greatly reduced, thereby eliminating the need for stocking and assembling the many housing components of the prior art configuration. In this manner, stocking costs are reduced, mounting space is conserved, and installation may be conducted more efficiently.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

In the drawing figures, which are not to scale, and which are merely illustrative, and wherein like reference numerals depict like elements throughout the several views.

DETAILED DESCRIPTION OF THE PREFERRED EMBODIMENTS

Figure 2:
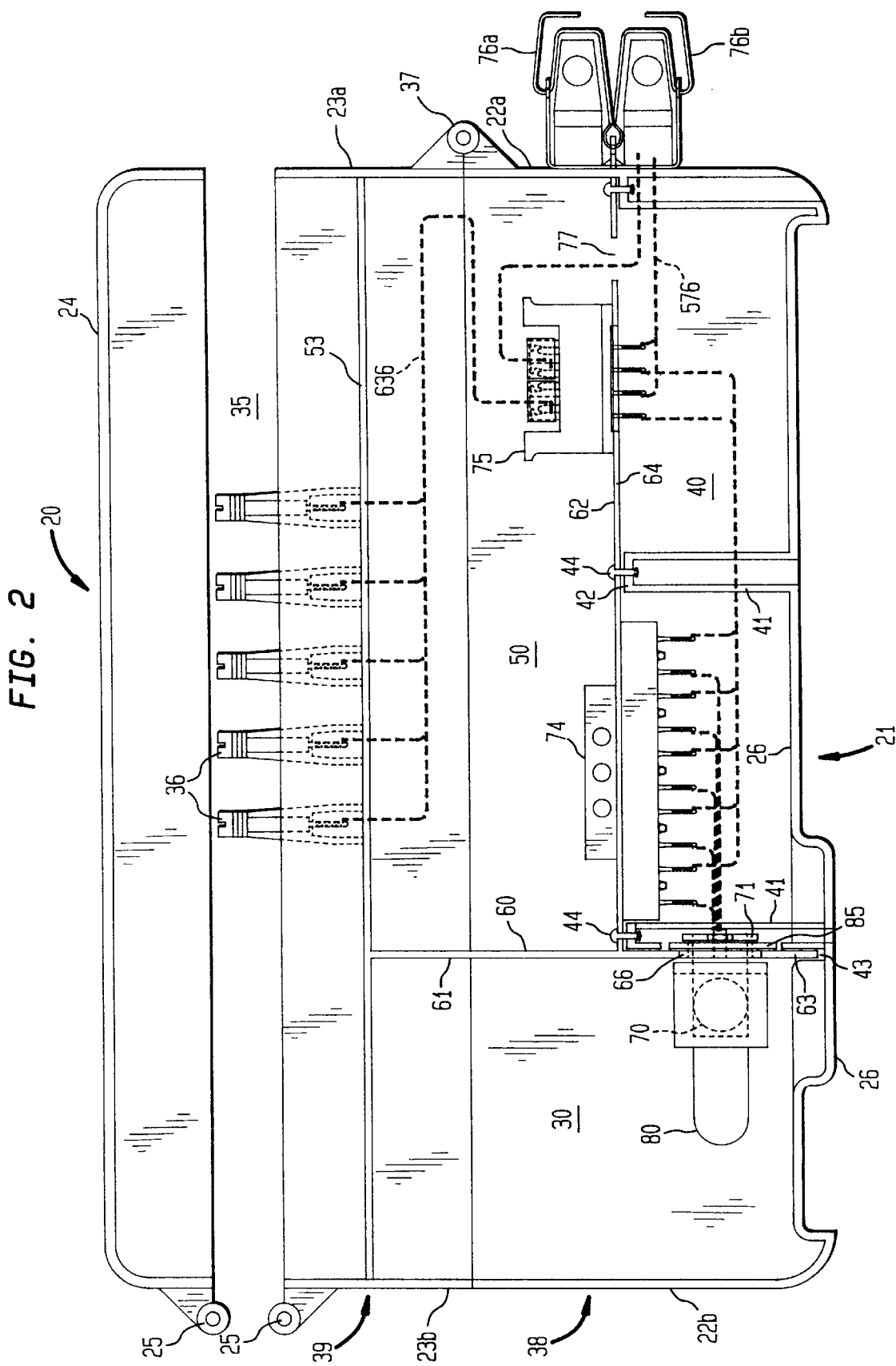
FIG. 2 is a bottom cross-sectional, partially exploded view of the housing of the present invention.

With initial reference to FIG. 2, there is depicted an exemplary wiring housing in accordance with the present invention, generally indicated as 20, for distributing wire pairs from a cable 80. Housing 20 is preferably configured as an enclosure for use as, by way of non-limiting example, a building entrance protector (BEP) and/or a network interface unit (NIU). Housing 20 includes a rear layer 38, which includes a base 21, generally forming the rear half of housing 20, and a front layer 39 and a cover 24, generally forming the front half of housing 20. Rear layer 38 is hingedly connected to front layer 39 by a layer hinge 37, and front layer 39 is hingedly connected to a cover 24 by a cover hinge 25. The interior of rear layer 38 is divided into three chambers—a splice chamber 30, a wiring chamber 40, and a network chamber 50—by a separator 60, generally T-shaped when viewed edge on or in cross section as shown, and substantially disposed within base 21.

Figure 3:
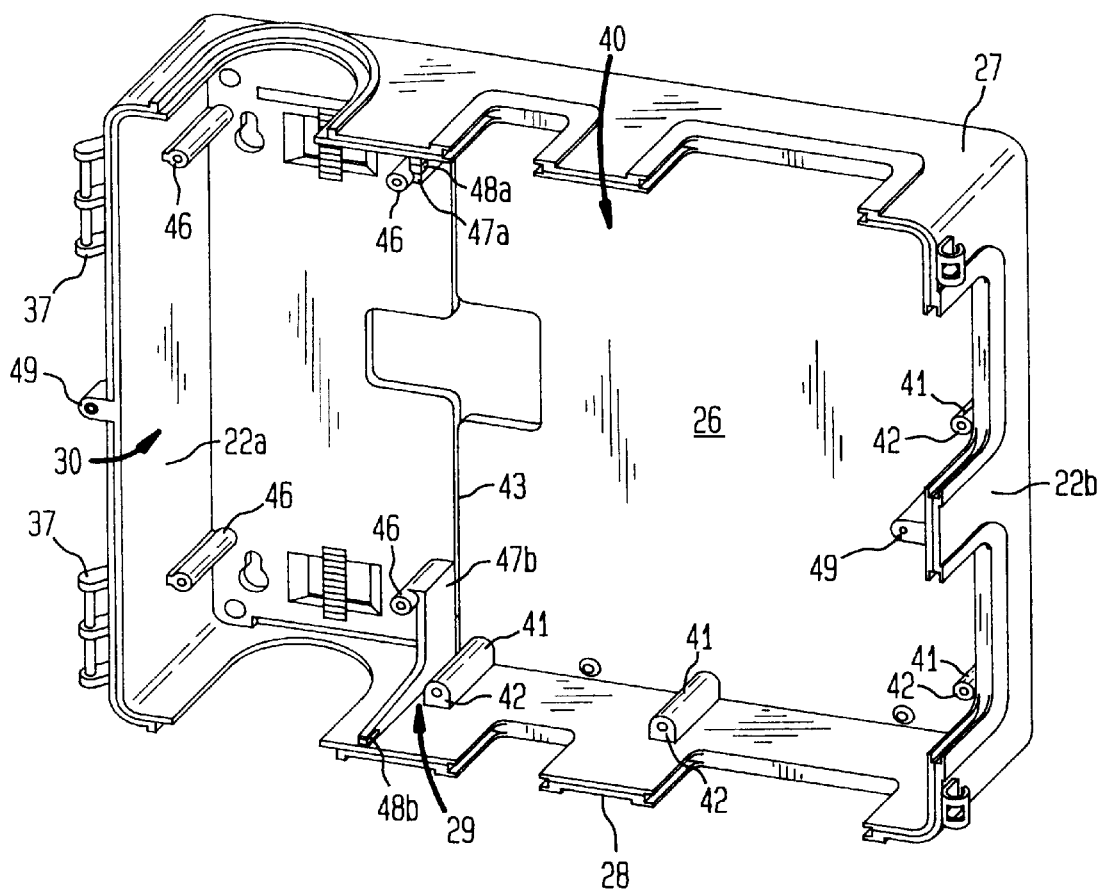
FIG. 3 is a perspective front view of a housing base of the present invention without the insert.

As is shown in FIG. 3, base 21 includes a rear wall 26 from which extend base side walls 22a and 22b, a base top wall 27 and a base bottom wall 28. Base 21 is preferably formed from a single mold, but may consist of one or more components which form a unitary base structure, such that when combined with separator 60, and as further described herein, multiple chambers and mounting surfaces are formed within the enclosure with no need to assemble multiple housing components to form such chambers and/or surfaces.

Front layer 39 is sized to mate with base 21, and is connected to base 21 by means of a layer hinge 37. In turn, cover 24 is sized to mate with front layer 39, and is connected to base 21 by means of a cover hinge 25 to seal front layer 39 of housing 20. Base 21, front layer 39, and cover 24 may be formed of a plastic, metal or synthetic material or any other suitable material, or any combination thereof. Hinges 25 and 37 may be any pivotable connection permitting relative angular movement between cover 24 and front layer 39, and base 21 and front layer 39, respectively, such as, for example, multiple individual hinges, a piano hinge, a living hinge, or other art-recognized pivotable connections.

Figure 4:
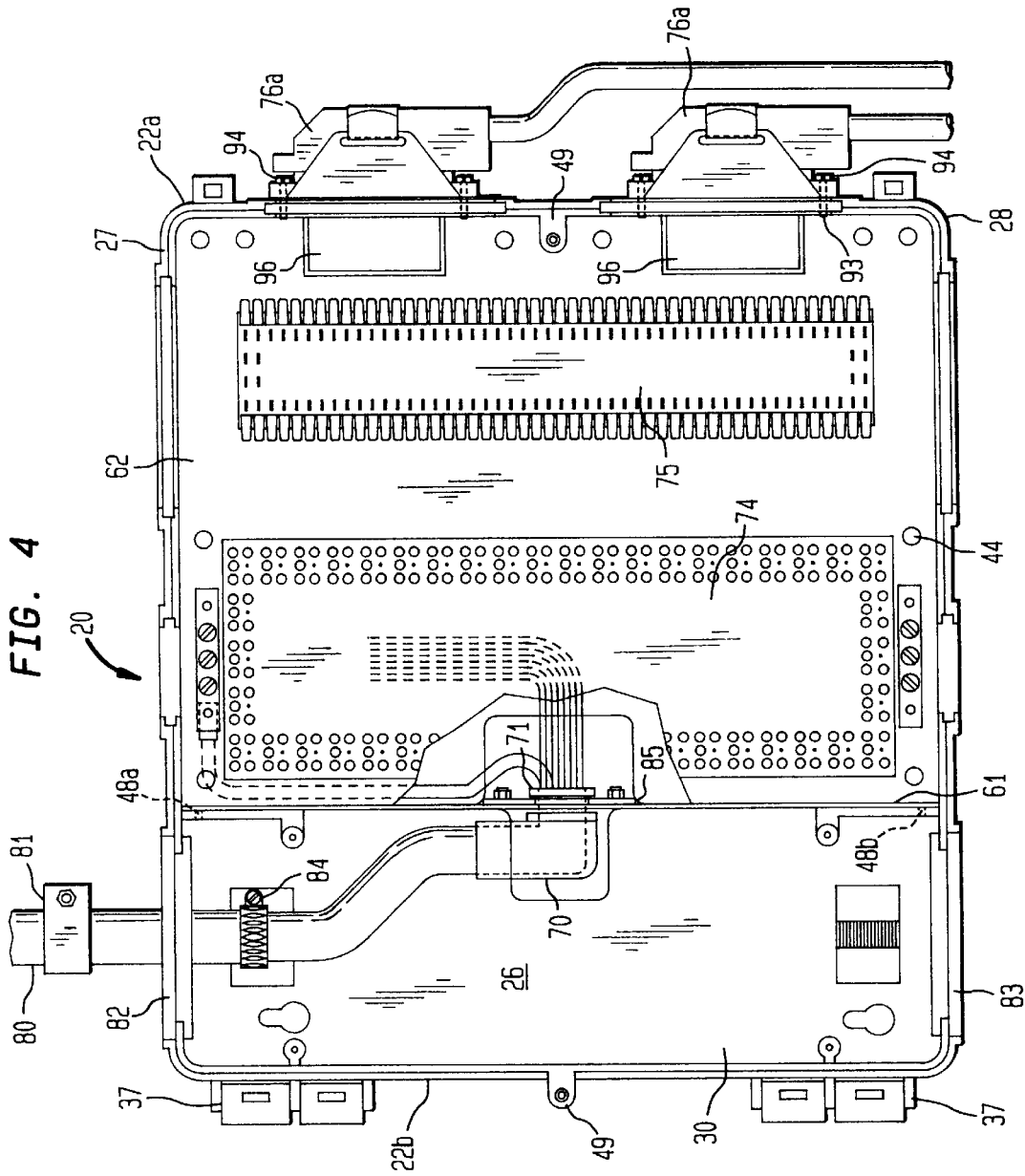
FIG. 4 is a front elevational, partial cutaway view of the base of the present invention with the insert mounted therein.

As is shown in FIGS. 3 and 4, base 21 and front layer 39 may be joined by an optional securement device having a male mating portion (not shown) connected to front layer 39 and a female mating portion 49 connected to base 21 that permits a user to lock base 21 to front layer 39. Similarly, front layer 39 may be joined by an optional securement device having a male mating portion (not shown) connected to cover 24 and a female mating portion 49 connected to front layer 39 that permits a user to front layer 39 to cover 24. The securement devices may be a lock, latch, screw, magnetic closure or other art-recognized means of maintaining the front layer and/or the cover in a closed position.

In a first embodiment of the invention shown in FIG. 2, front layer 39 includes a bridge panel 53, which is positioned substantially parallel to cover 24, and extends from a first side wall 23a of front layer 39 to a second side wall 23b of front layer 39. Bridge panel 53 also extends vertically from the bottom wall to the top wall of front layer 39. As such, bridge panel 53, together with cover 24, first and second side walls 23a, 23b, and a portion of the top and bottom walls (not shown) of front layer 39, create a bridge chamber 35 within front layer 39 of enclosure 20. Bridge panel 53 is preferably mounted to bosses (not shown) that extend from side walls 23a and 23b of front layer 39 by pop rivets, but may be mounted by any means known in the art, such as, screws, glue, heat welds, ultrasonic welds, etc. Bridge panel 53 may be used as a mounting site for various connectors from which telephone wire pairs may be hard-wired to various terminal equipment, such as facsimiles and telephones.

Separator 60 is formed in the shape of a "T" when viewed edgewise, and may be fabricated by bending a single sheet of metal into the T shape. Separator 60 may formed of a metal, plastic, synthetic material, or any other material suitable to the application in which the invention will be deployed, or any combination thereof, as a matter of simple design choice. In addition, separator 60 may be formed of one or more sheets of material welded, bonded or otherwise suitably joined.

As shown in FIG. 2, separator 60 includes a depth divider 61, which forms splice chamber 30 and separates it from the remainder of the enclosure when separator 60 is inserted into base 21, and length divider 62, which forms wiring chamber 40 and network chamber 50 and also separates the two chambers. Preferably, depth divider 61 extends from rear wall 26 of base 21 to bridge panel 53, thereby acting to completely seal splice chamber 30 from the remainder of housing 20 and dispensing with any need for a separate cover for splice chamber 30.

Figure 5:
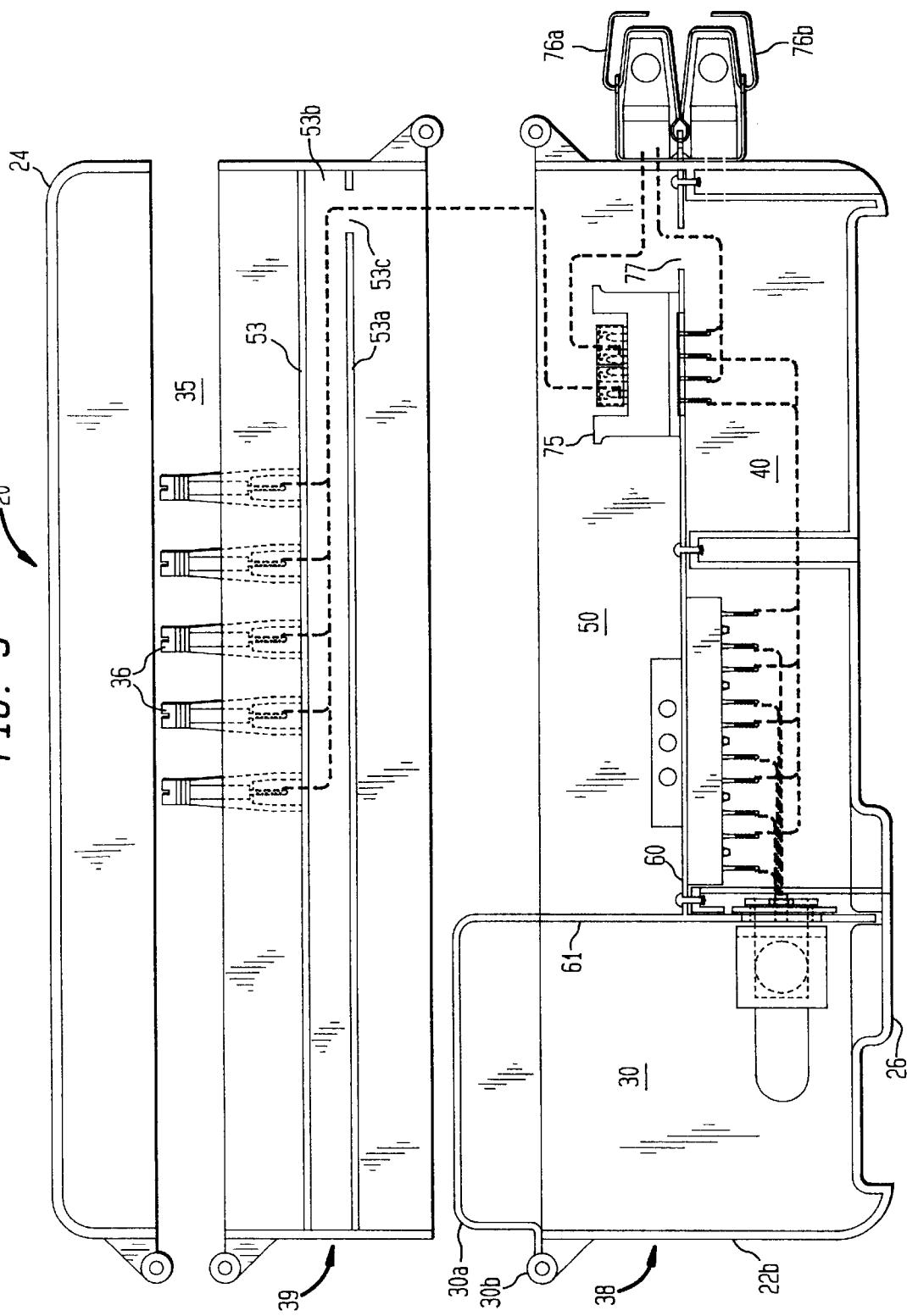
FIG. 5 is a bottom cross-sectional, partially exploded view of an alternate embodiment of the housing of the present invention.

Alternatively, as shown in an alternative embodiment in FIG. 5, enclosure 20 may include a splice chamber cover 30a hingedly connected to base 21 by means of a hinge 30b. As with the other hinges, hinge 30b may be any pivotable connection permitting relative angular movement between cover 30a and base 21, such as, for example, multiple individual hinges, a piano hinge, a living hinge, or other art-recognized pivotable connections. In this manner, splice chamber cover 30a together with depth divider 61 of separator 60, side wall 22b, and a portion of rear wall 26, top wall 27, and bottom wall 28 of base 21 form splice chamber 30.

Figure 1:
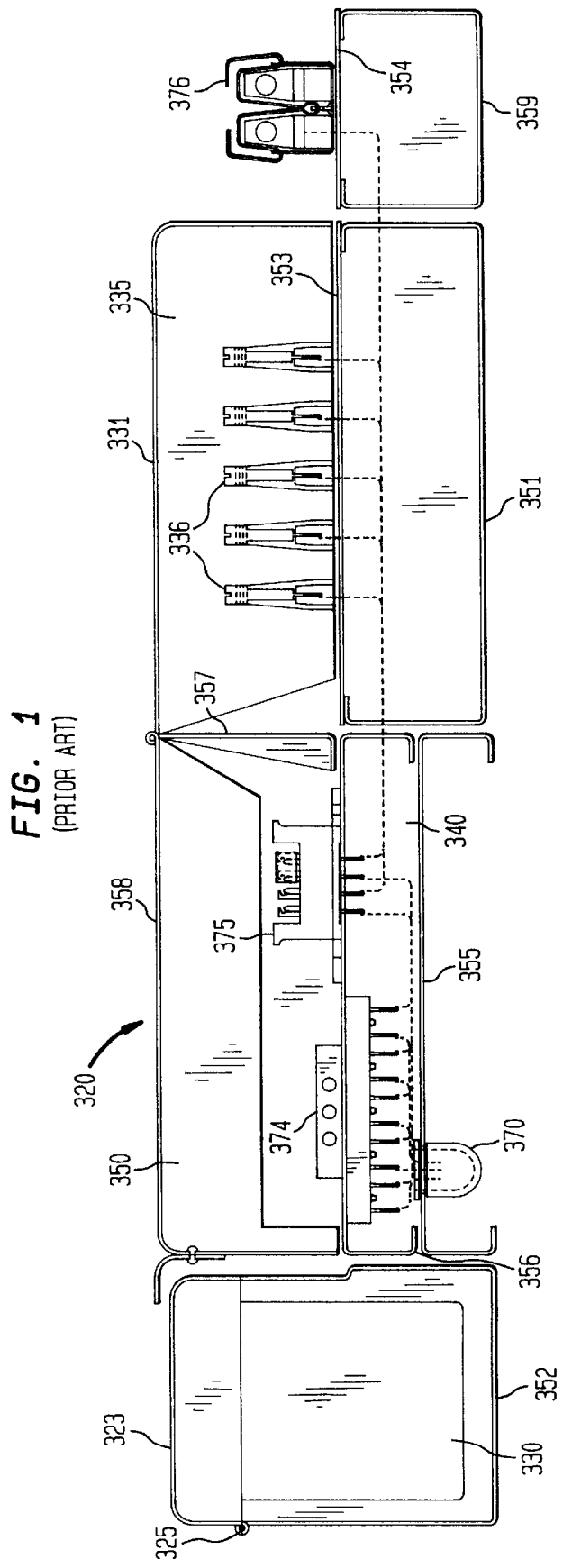
FIG. 1 is a bottom cross-sectional view of a prior art housing.

Referring to FIGS. 2 and 4, both depth divider 61 and length divider 62 extend from bottom wall 28 to top wall 27 of base 21. By designing housing 20 to include an integral splice chamber 30 when separator 60 is inserted, the installer no longer needs to install a separate splice chamber 330 as is shown in FIG. 1. Depth divider 61 may preferably be formed with an opening 66 to permit a swivel stub 70 to be mounted therein such that swivel stub 70 is located in splice chamber 30 and can channel the individual wire pairs of cable 80 (FIG. 4) into wiring chamber 40. By locating swivel stub 70 in splice chamber 30, swivel mounting panel 355 shown in FIG. 1 is no longer a necessary component of housing 20. Moreover, quick assembly and wiring is facilitated and greatly simplified, since wiring connections between the swivel stub and wiring chamber may be done at the factory, and need not be performed in the field.

Referring to FIGS. 2 and 4, length divider 62 extends (FIG. 2) from depth divider 61 to side wall 22a. The surface of length divider 62 provides a mounting site for various art-recognized electrical components, including, by way of non-limiting example, a protector field 74 and a connector block 75. In most configurations, the individual wire pairs enter housing 20 through splice chamber 30 and are hard wired to protector field 74 in wiring chamber 40 to protect the equipment to which a wire pair is connected (and the user of such equipment), in an art-recognized manner, from hazardous overvoltages induced in the telephone network or in cable 80, which passes between the telephone central office and housing 20. The individual wire pairs are then in turn hard wired to connector block 75, which provides a test point for testing the telephone line connections between the building and the telephone central office.

This first terminal block may then be hard-wired to a multi-pair connector via one or more conductors 576, such as RJ21 connector 76b, for further connection to a remote customer bridge or other art utilized connector field, which may also be hard-wired and connectorized via a mating RJ21 connector in an art-recognized manner. Alternatively, as is shown in FIG. 2, connector block 75 may be hard-wired via one or more conductors 636 to RJ11-type connectors (not shown) in customer bridges 36 contained within customer bridge chamber 35 via openings (not shown) in bridge panel 53 to form a customer bridge, which provides a second test point for testing the telephone line connections. The use of a customer bridge permits a subscriber to disconnect terminal equipment from a telephone line so that the subscriber can isolate troubles on the line as originating in the telephone network, or on the terminal equipment side of the telephone line.

In this case, the remaining wire pairs from connector block 75 may be hard-wired to additional RJ21 connector 76a so that the wire pairs may be further connected to other equipment (not shown) at a location remote to housing 20. In one embodiment, the different wiring combinations of which are shown in FIGS. 2, 5 and 6, length divider 62 is formed with at least one opening 77 to permit the installer to hard wire connector block 75 to one of a pair of RJ21 connectors 76a, 76b from either network chamber 50 or wiring chamber 40. Alternatively, length divider 62 may include knockouts 96, as shown in FIG. 4, which facilitate the flexible creation of openings 77 by the installer. Such an embodiment has the additional benefit of completely separating wiring chamber 40 and network chamber 50 unless the installer needs to pass wires between the chambers. Of course, the person of skill will recognize from the teachings herein that the specific configuration of component layout and/or wiring scheme, whether field installed or factory installed, is readily adaptable to many application specific requirements, as a matter of design choice, all of which are facilitated by the flexibility afforded by the unitary housing and modular insert of the present invention.

Once separator 60 is inserted into base 21, it is preferably securely mounted to base 21. Referring to FIG. 3, bosses 41 extend normally from rear wall 26 in wiring chamber 40. Bosses 41 each include a face 42 to which length divider 62 of separator 60 is mounted. Rear wall 26 is also formed with a slot 43 sized to accommodate the width of depth divider 61. Thus, when separator 60 is inserted into and mounted to housing 20, as is shown in FIG. 2, a rear portion 63 of depth divider 61 is accommodated in slot 43 and a rear surface 64 of length divider 62 abuts faces 42 of bosses 41. Length divider 62 is preferably mounted to faces 42 of bosses 41 by pop rivets 44, but may be mounted by any means known in the art, such as, screws, glue, heat welds, ultrasonic welds, etc. To further support separator 60, referring to FIG. 3, members 47a and 47b, which extend from rear wall 26 in a direction substantially parallel to side wall 22a, are provided. A channel 29 (FIG. 3) is formed between member 47a and 47b and those bosses 41 adjacent members 47a and 47b, and is sized to accommodate depth divider 61 of separator 60. Members 47a and 47b have slots 48a and 48b, which provide locations for securement of depth divider 61 to base 21 using a device such as a screw, cable tie, pop rivet or any other means known to the person skilled in the art.

Bosses 46 extend from rear wall 26 in splice chamber 30 to provide a mounting surface for a splicing connector (not shown). Bosses 41 and 46 are preferably integrally formed with base 21, but may be attached to base 21 in any manner known to one skilled in the art, such as by a connector device, by heat molding, gluing, welding or the like.

Referring to FIG. 4, cable 80 may enter splice chamber 30 either through an opening in a top panel 82 or a bottom panel 83 of splice chamber 30. Prior to entering splice chamber 30, cable 80 is typically secured to a mounting surface by a bracket 81. After entering splice chamber 30, cable 80 is generally strain-relieved by gripping cable 80 with a strain relief 84 mounted on rear wall 26 in an art-recognized manner. In the embodiment shown in FIG. 4, cable 80 is then channeled to wiring chamber 40 by way of swivel stub 70. Alternatively, the individual pairs of wires in cable 80 may be broken out in splice chamber 30 and connected to a splicing connector (not shown) within splice chamber 30 prior to being hard wired to protector panel 74 in wiring chamber 40. Swivel stub 70 is capable of pivoting at least 180° to accept cable 80 whether it enters through top panel 82 or bottom panel 83 of splice chamber 30. Swivel stub 70 may be secured to depth divider 61 by a securement plate 85, which engages flange 71 of swivel stub 70, and may be secured to depth divider 61 by any means known to those skilled in the art.

In another embodiment, cable 80 may pass through splice chamber 30 out an opening in top panel 82 or bottom panel 83 to a second housing mounted adjacent housing 20. In this manner, splice chamber 30 can form a trough through which cable 80 passes, thereby facilitating the installation of multiple housings at the same location by permitting the installer easy access to cables passing through one or more housings to the housing in which the wire pairs are broken out.

As is shown in FIG. 3, side wall 22b is preferably provided with panels (not shown), which are spaced apart in the vertical direction, and include two sets of knockouts (not shown) positioned adjacent wiring chamber 40 and network chamber 50. Depending on the customer's requirements, the installer may remove one or more of the knockouts to permit access to RJ21 connector 76a, 76b. Referring to FIG. 4, RJ21 connectors 76a, 76b may be secured to rear wall 26 by a securement device, such as screws 94, which are screwed into screw holes 93 of side wall 22b. Typically, cable 80 contains 100 individual pairs of telephone wires, and up to 25 of these pairs may be connectorized using each RJ21 connector 76a, 76b. Therefore, housing 20 is preferably provided with a total of four knockouts so that a total of four RJ21 connectors may be secured directly to housing 20. Of course, in the embodiment shown in FIGS. 2, 5 and 6, a number of the conductors are wired directly to customer bridge compartment 35, thereby rendering the use of all four knockouts unnecessary. By mounting RJ21 connectors 76 to side wall 22b of housing 20, the installer no longer needs to mount prior art RJ21 module 359 and mounting cover 354 as is shown in FIG. 1, thereby reducing installation time and the components necessary to distribute wire pairs.

As is shown in FIG. 4, a pair of RJ21 connectors 76a, 76b is preferably mounted on side wall 22b of housing 20 such that RJ21 connector 76a is adjacent to network chamber 50 and the RJ21 connector 76b is adjacent network chamber 40.

Such a design increases installation flexibility as RJ21 connector 76*a* may be accessed directly from network chamber 50 through a knockout (not shown) or from wiring chamber 40 through opening 77 in length divider 62 and a knockout (not shown), and RJ21 connector 76*b* may be accessed directly from wiring chamber 40 through a knockout or from network chamber 50 through opening 77 in length divider 62. Various RJ21 connector wiring combinations are depicted in FIGS. 2, 5 and 6.

While separator 60 is depicted as dividing base 21 into a front, network chamber 50 and a rear, wiring chamber 40, separator 60 may also be configured to divide the volume of base 21 in any number of ways. For example, separator 60 can consist of a depth divider 61 that lies in a plane substantially parallel to side walls 22*a* and 22*b* and a length divider attached to depth divider 61 that lies in a plane substantially parallel to top wall 27 and bottom wall 28 to form an upper chamber and a lower chamber. Further, separator 60 may include more than two dividing walls to divide enclosure into more than three compartments or to provide additional support.

Referring to FIG. 5, another embodiment of the invention is depicted. As is discussed above, enclosure 20 of this embodiment can include a splice chamber cover 30*a*, which is hingedly connected to base 21 by means of a hinge 30*b*, thereby forming splice chamber 30. As such, in this embodiment, depth divider 61 of separator 60 is shorter than depth divider 61 of FIG. 2 as it need only extend from rear wall 26 to mate with splice chamber cover 30*a* to form splice chamber 30. In this manner, when front layer 39 is opened to permit access to network chamber 50, splice chamber 30 remains protected by cover 30*a*.

Further, this embodiment also modifies front layer 39 by adding a second panel 53*a* positioned substantially parallel to cover bridge panel 53, and extending from first side wall 23*a* to a second side wall 23*b*. As with bridge panel 53, second panel 53*a* extends vertically from the bottom wall to the top wall of front layer 39. In this way, bridge panel 53 and second panel 53*a* together with portions of the top and bottom walls (not shown) and first and second side walls 23*a*, 23*b*, create a wiring trough 53*b* within front layer 39 of enclosure 20. As with bridge panel 53, second panel 53*a* is preferably mounted to bosses (not shown) that extend from side walls 23*a* and 23*b* of front layer 39 by pop rivets, but may be mounted by any means known in the art, such as, screws, glue, heat welds, ultrasonic welds, etc.

Second panel 53*a* includes an opening 53*c* to permit conductors from connector block 75 to be passed through opening 53*c* to wiring trough 53*b*, whereupon the conductors can be hard-wired to RJ11 connectors through openings (not shown) in bridge panel 53. Wiring trough 53*b* permits the conductors to be isolated from the remainder of enclosure 20. Of course, second panel may be utilized in the embodiment depicted in FIG. 2, just as readily as shown in FIG. 5. Such an embodiment would require either a shorter depth divider 61 or less space in bridge compartment 35.

In sum, the above-described embodiments of the invention provide a number of advantages. First, by providing an insertable separator 60, the electrical components for any given design may be mounted upon separator 60 at a location remote from the installation site, such as a factory. Further, where these components are connected by conductors, they may be wired at the same time. Therefore, on-site assembly time is reduced as the electrical components are mounted and wired prior to installation.

Second, the standardization of housing 20 reduces the number of components required to be mounted at the installation site. For example, as is shown in FIG. 1, a prior art configuration can require the mounting of nine or more separate components during installation, including swivel stub mounting panel 355, component mounting panel 356, network cover support bracket 357, RJ21 module 359, RJ21 mounting cover 354, and splice chamber base 352, network interface module 351, customer bridge mounting panel 353 and customer bridge cover 331. In comparison, the present invention requires that a housing 20 be mounted to a surface and a separator be mounted within housing 20. Thus, the current invention eliminates the need for many of the components of the prior art configuration, thereby reducing stocking costs and increasing installation efficiency. Third, the configuration of the current invention conserves space as it replaces the aforementioned multiple enclosures and panels.

Fourth, the current invention permits a more orderly arrangement of cables in the splice chamber as compared to the previous arrangement where cables were run side-by-side behind swivel stub mounting panel 355. In accordance with the present invention, the position of cables in the splice chamber facilitate access to the cables once multiple housings have been mounted on over the other, the splice chamber aligning to form a substantially continuous cable trough that cables may be easily laid in.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A multi-layer housing for distributing conductors within the housing, comprising:
    a base having a rear wall, and a base top wall, a base bottom wall, a first base side wall and a second base side wall, each extending from the rear wall;
    a layer hingedly attached to said base and having a layer top wall, a layer bottom wall, a first layer side wall and a second layer side wall;
    a cover hingedly attached to the layer; and
    an insertable separator detachably mounted to and substantially disposed within said base for dividing the housing into a plurality of conductor receiving chambers, said separator comprising a dividing wall extending substantially parallel to said base rear wall such that at least one of said plurality of conductor receiving chambers is formed between said separator dividing wall and said base rear wall;
    wherein said layer is adapted to hingedly pivot independent of and away from said separator.

2. The housing of claim 1, wherein the separator includes a first dividing wall for dividing the volume of the base along a first plane, and a second dividing wall extending at an angle from said first dividing wall for dividing the volume of the base along a second plane, so as to form, along with the layer, three chambers within said base.

3. The housing of claim 2, further comprising a cover hingedly attached to said layer and a bridge panel disposed within the layer and substantially parallel to the cover, and wherein the first dividing wall, a portion of the layer and the bridge panel define a splice chamber.

4. The housing of claim 2, comprising a splice chamber cover hingedly attached to the first base side wall, and wherein the first dividing wall, a portion of the layer and the splice chamber cover define a splice chamber.

5. The housing of claim 3, wherein the second dividing wall, the first dividing wall and a portion of the layer define, on opposite sides of said second dividing wall, a wiring chamber and a network chamber.

6. The housing of claim 2, wherein the second dividing wall is substantially perpendicular to the first dividing wall.

7. The housing of claim 5, wherein the first dividing wall has an opening, and further comprising a swivel stub disposed within the first dividing wall opening for channeling the conductors between the splice chamber and the wiring chamber.

8. The housing of claim 5, wherein the second dividing wall includes an openable portion for selectively permitting conductors to be passed between the wiring chamber and the network chamber.

9. The housing of claim 2, comprising a bridge panel disposed within the layer and substantially parallel to the cover, and wherein the first dividing wall is substantially parallel to the first base side wall and extends from the rear wall to the bridge panel.

10. The housing of claim 9, wherein the second dividing wall is substantially parallel to the rear wall and extends from the first dividing wall to the second base side wall.

11. The housing of claim 1, comprising a connector mounted on the second base side wall for distributing selected conductors from within said housing to a location outside the housing.

12. The housing of claim 6, wherein the separator is substantially T-shaped when viewed edgewise.

13. The housing of claim 2, comprising a protector field and a connector block mounted to the second dividing wall.

14. The housing of claim 5, wherein the second dividing wall includes an openable portion for selectively permitting conductors to be passed between the wiring chamber and the network chamber.

15. The housing of claim 2, comprising a connector mounted on the second base side wall for distributing selected conductors from within said housing to a location outside the housing.

16. The housing of claim 15, further comprising a plurality of connectors mounted to the base, each in fluid communication with the other and with the network chamber and the wiring chamber, so that selected conductors may be routed from either chamber to any of the plural connectors.

17. The housing of claim 1, wherein the base has bosses formed in the base for providing a mounting surface to which the separator is detachably mounted.

18. The housing of claim 17, wherein the base is a single, molded unit.

19. The housing of claim 3, wherein the splice chamber includes a plurality of openings to permit a cable to pass through the splice chamber.

20. The housing of claim 5, further comprising a swivel stub mounted to the first dividing wall and a protector field and a connector block mounted to the second dividing wall, the swivel stub being wired to the protector field and the protector field being wired to the connector block prior to mounting the separator in the base.

21. The housing of claim 13, further comprising a customer bridge mounted to said layer.

22. A housing for distributing wires passing therein, comprising a unitary enclosure base, a layer hingedly connected to the base, a cover hingedly attached to the layer, and a chamber separator substantially disposed within the base for dividing the housing into at least three wire-receiving chambers, at least two of the chambers being in fluid communication for the selective passage of wires therebetween, said separator comprising a dividing wall extending substantially parallel to a rear wall of said base such that at least one of said wire-receiving chambers is formed between said separator dividing wall and said base rear wall;

wherein said layer is adapted to hingedly pivot independent of and away from said separator.

23. The housing of claim 22, comprising a cover hingedly attached to the layer and a bridge panel mounted to the layer and substantially parallel to the cover, and wherein the layer has a layer top wall, a layer bottom wall, a first side and a second side, the bridge panel, layer top wall, layer bottom wall, first side and second side, and cover form a bridge compartment.

24. The housing of claim 22, wherein said enclosure is a building entrance protector.

25. The housing of claim 22, wherein the enclosure is a network interface unit.

26. The enclosure of claim 22, wherein the chamber separator is removably mountable within the enclosure.

27. The housing of claim 23, comprising a second panel mounted within the layer substantially parallel to and spaced apart from the first panel, the bridge panel, layer top wall, layer bottom wall, first side and second side and the second panel together forming a wiring trough within the layer.

* * * * *